United States Patent Office 2,816,734
Patented Dec. 17, 1957

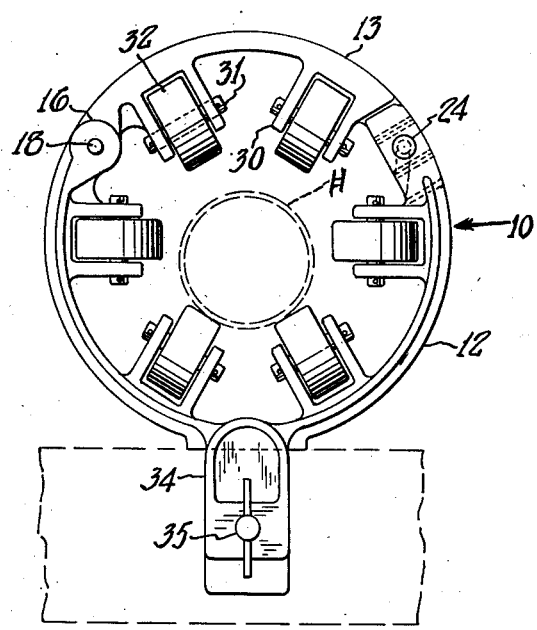
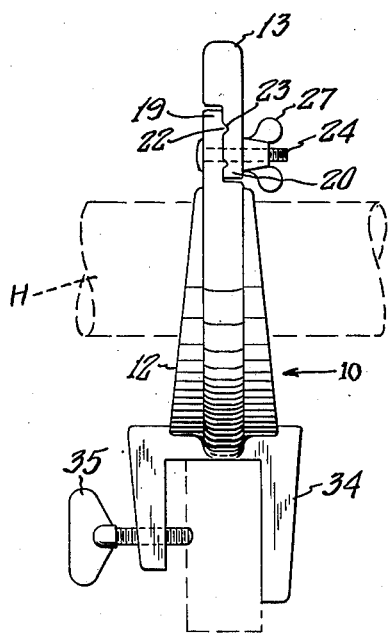
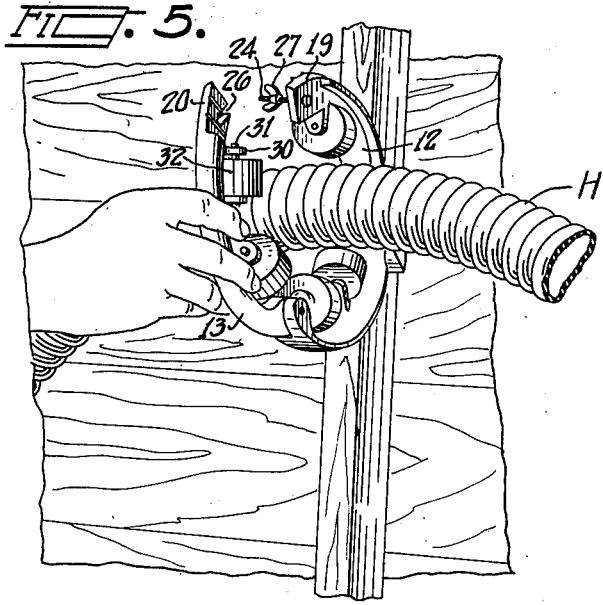
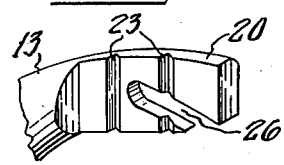
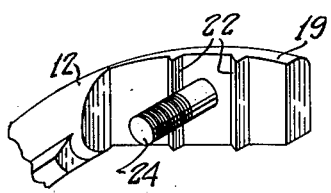
INVENTOR
PERNIE P. CROFOOT

2,816,734

PORTABLE HOSE GUIDE

Pernie P. Crofoot, Salem, Oreg.

Application August 20, 1954, Serial No. 451,179

1 Claim. (Cl. 254—190)

This invention relates to a guide for flexible hose and the like.

The invention is concerned particularly with the problem of drawing out a long section of hose around corners and obstructions which impede the advancement of a hose and make it difficult to move by merely pulling on a free end.

A principal object of the invention is to provide a hose guide which is portable in nature and which has means for temporary attachment to portions of a building structure and the like.

Another object is to provide a hose guide having a sectional ring frame with a portion adapted to open for conveniently receiving a hose to be guided therethrough without the necessity of reeving said hose from one of its ends.

A further object is to provide locking means on said frame for effecting quick detachable connection with the opening section.

Further objects are to provide a hose guide or fair-lead which is light in weight so as to be easily transported and clamped in a desired position and which facilitates smooth, guided movement of a hose pulled therethrough.

The present invention is used for guiding flexible lines, such as hose, cable, rope and the like and is particularly referred to herein as a guide for hoses used for blowing loose insulation material in wall spaces or in attics of a building structure. The purpose of the guide is to allow a hose to be pulled easily around corners or other obstructions in angular directions and at the same time to prevent damage to the hose or building parts by keeping the hose off sharp corners or edges, window sills, heating pipes, electric wiring and the like. These purposes and the above objects are accomplished by a portable device having rollers mounted therein to support the hose in a ring frame. The guide has means removably to clamp it on various structures and can be mounted in different convenient positions as desired. A hinged frame member provides a side opening for inserting a hose in the guide without reeving the hose from one of its ends.

The invention will be better understood and additional objects and advantages will become apparent from the following description taken in connection with the accompanying drawings which illustrate a preferred form of the device. It is to be understood, however, that the invention may take other forms and that all such modifications and variations within the scope of the appended claim which will occur to persons skilled in the art are included in the invention.

In the drawings:

Fig. 1 is a front elevational view of the present hose guide;

Fig. 2 is a side elevational view;

Figs. 3 and 4 are fragmentary perspective views showing a lock joint for the hinged frame section, and Fig. 5 is a perspective view showing the hinged frame in opened position for receiving a hose.

Referring to the drawing, the device comprises a ring frame, of aluminum or other suitable strong, light weight material, designated generally by the numeral 10, and, as shown herein the frame is preferably circular in shape, although it is apparent that it may take other shapes. The frame 10 is cast or otherwise formed of two arcuate sections 12 and 13, the section 12 comprising a base structure and the section 13 comprising a hinged gate member. One end of the arcuate base 12 has a pair of apertured ears 16 for receiving a pivot pin 18. One end of the gate 13 is mounted on the pin 18 and the gate is rotatable on the pin between a closed position, as shown in Figure 1, and an open position for receiving a hose, as shown in Figure 5.

The other connecting ends of base 12 and gate 13 are cut away at 19 and 20, respectively, to form a lapped joint, best seen in Figures 3 and 4. End 19 of the base 12 is provided with transverse projections in the form of ridges 22, and the end 20 of the gate has corresponding depressions in the form of grooves 23 for receiving the ridges 22 in a locked position of the parts. A stud 24 is secured in the base end 19 and the free end of gate 13 has a slot 26, Figure 3, for receiving said stud. Slot 26 extends diagonally inwardly from the inner edge of the gate end in a direction coincident with the arc of movement of the gate end 20 on the pin 18 to straddle stud 24 when the gate is closed. A wing nut 27 threaded on the stud holds the joint together, and ridges 22, engaged in grooves 23, prevent the gate from rotating on its pivot when the wing nut 27 is tightened, owing to the transverse direction of the ridges and grooves relative to slot 26.

Frame sections 12 and 13 are provided with pairs of inwardly projecting ears 30 which are apertured to receive spindles 31. Mounted on the spindles 31 are rollers 32 rotatable in different radial planes with respect to the center of the circular frame and forming a central opening. A hose H drawn through the guide engages the peripheral surface of two or more rollers with negligible friction even though it be of the corrugated type shown which could not be pulled across bare joints or beams.

The frame section 12 has a clamping member thereon comprising a bracket 34 and a clamping screw 35. The clamping member permits the guide to be mounted on portions of a building structure such as rafters, studs, joists or the like, by fitting the bracket on the building structure and tightening screw 35.

The present guide is useful for supporting a hose or the like around corners or over edges without damage either to the hose or the woodwork. When insulating attics, the hose must be extended into windows and otherwise around corners, and by clamping one or more of the guides on rafters or joists, or other building structures, the hose can be kept off the windowsills and off the sharp edges of other structural parts, thus facilitating ease of handling of the hose for a single workman and for preventing damage to the hose or woodwork. The present guide is also useful for supporting such a hose out of contact with heating pipes, electric wiring and other easily damaged appurtenances.

A hose may be inserted in the guide by reeving one end therethrough, or it may also be inserted by opening the gate 13 to receive a mid-portion of the hose, as shown in Figure 5. To open the gate 13, the wing nut 27 is loosened slightly on the stud 24 and the end 20 of the gate moved laterally to disengage grooves 23 from the ridges 22. Disengagement of the ridges from the grooves permits the gate to swing open on its pivot 18. The hinged connection between the base section 12 and gate section 13 has a loose fit to permit the gate to twist laterally a distance sufficient to disengage grooves 23 from the ridges 22.

Having now described my invention and in what man- ner the same may be used, what I claim as new and desire to protect by Letters Patent is:

A portable guide for flexible hose and the like comprising a circular ring frame having a base section and a gate section pivotally connected at one end to said base section, a plurality of pairs of radial ears integral with and projecting inwardly from both of said frame sections, spindles mounted in said ears in the plane of the ring frame, rollers mounted on said spindles between said pairs of ears for supporting a hose trained through said ring frame, overlapping flat surfaces on the swinging end of said gate section and said base section disposed in the plane of said ring, a stud in said base section projecting perpendicular to said flat surface on said base section, a tangential open end slot in said flat surface portion of the swinging end of said gate section arranged to receive said stud, interfitting projections and recesses on said overlapping surfaces, a nut on said stud to clamp said projections and recesses into locking engagement, and a screw clamp on said base section for removable attachment to a support.

References Cited in the file of this patent

UNITED STATES PATENTS

| | | |
|---|---|---|
| 248,061 | Sharrett | Oct. 11, 1881 |
| 298,241 | Schneider | May 6, 1884 |
| 522,524 | Hook | July 3, 1894 |
| 978,912 | Mack | Dec. 20, 1910 |
| 981,769 | Kinowski | Jan. 17, 1911 |
| 1,586,172 | Baice | May 25, 1926 |
| 2,070,925 | Rolfs et al. | Feb. 16, 1937 |
| 2,202,184 | Berger | May 28, 1940 |
| 2,422,353 | Hitt | June 17, 1947 |